(12) United States Patent
Hornung et al.

(10) Patent No.: US 6,807,602 B1
(45) Date of Patent: Oct. 19, 2004

(54) SYSTEM AND METHOD FOR MAPPING BUS ADDRESSES TO MEMORY LOCATIONS UTILIZING ACCESS KEYS AND CHECKSUMS

(75) Inventors: Bryan Hornung, Plano, TX (US); Keith W. Shaw, Plano, TX (US); Paul F. Vogel, Garland, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 562 days.

(21) Appl. No.: 09/699,877

(22) Filed: Oct. 30, 2000

(51) Int. Cl.⁷ .............................................. G06F 12/00
(52) U.S. Cl. ......................................... 711/5; 711/164
(58) Field of Search ................................ 711/164, 163, 711/145, 5

(56) References Cited

U.S. PATENT DOCUMENTS

| | | | |
|---|---|---|---|
| 3,825,903 A | * 7/1974 | Brown ......................... | 711/163 |
| 4,695,947 A |   9/1987 | Ikeda et al. .................. | 364/200 |
| 4,849,978 A |   7/1989 | Dishon et al. ................ | 371/51 |
| 5,007,053 A | * 4/1991 | Iyer et al. .................... | 714/718 |
| 5,163,096 A | * 11/1992 | Clark et al. .................. | 711/164 |
| 5,230,045 A |   7/1993 | Sindhu ........................ | 395/425 |
| 5,293,607 A | * 3/1994 | Brockmann et al. ........... | 711/5 |
| 5,446,691 A |   8/1995 | North et al. ........... | 365/189.02 |
| 5,479,624 A | * 12/1995 | Lee ............................. | 711/1 |
| 5,530,837 A | * 6/1996 | Williams et al. ............. | 711/157 |
| 5,761,695 A |   6/1998 | Maeda et al. ................. | 711/5 |
| 5,890,189 A | * 3/1999 | Nozue et al. ................. | 711/100 |
| 5,900,019 A | * 5/1999 | Greenstein et al. .......... | 711/164 |
| 5,966,727 A |   10/1999 | Nishino ....................... | 711/127 |
| 5,968,200 A | * 10/1999 | Amrany ........................ | 714/786 |
| 6,081,876 A | * 6/2000 | Brewer et al. ............... | 711/163 |
| 6,381,668 B1 | * 4/2002 | Lunteren ........................ | 711/5 |

OTHER PUBLICATIONS

"A Case for Redundant Arrays of Inexpensive Disks (RAID)", ACM SIGMOD Conference, Chicago, Ill., Jun. 1–3, 1988 by D.A.Patterson, G. Gibson and R.H.Kats.*

* cited by examiner

*Primary Examiner*—Matthew Kim
*Assistant Examiner*—Shane Thomas (57) ABSTRACT

A data storage system utilizes a plurality of memory systems, at least one processor, and a mapping system. Each of the memory systems has memory and a memory controller for storing and retrieving data. The processor transmits requests for writing data values. These requests include bus addresses. The mapping system maps the bus addresses into memory addresses. The mapping system maps consecutive bus addresses such that the memory addresses mapped from the consecutive bus addresses are interleaved across a plurality of the memory systems. In response to the foregoing requests from the processor, the mapping system identifies checksum system identifiers that identify locations where checksum values to be updated based on the aforementioned data values are stored. The checksum system identifiers preferably identify each of the plurality of mapping systems so that the checksum identifiers and, therefore, the checksum updates that occur based on these checksum system identifiers are interleaved across these memory systems.

25 Claims, 8 Drawing Sheets

(Prior Art)

FIG. 3

(Prior Art)

FIG. 4

(Prior Art)

SYSTEM AND METHOD FOR MAPPING BUS ADDRESSES TO MEMORY LOCATIONS UTILIZING ACCESS KEYS AND CHECKSUMS

BACKGROUND OF THE INVENTION

1. Field of the Invention

The present invention generally relates to data processing techniques and, in particular, to a system and method for efficiently storing data produced by one or more processing units.

2. Related Art

Large computer systems (or servers) often employ a plurality of memory units to provide enough instruction and data memory for various applications. Each memory unit has a large number of memory locations of one or more bits where data can be stored, and each memory location is associated with and identified by a particular memory address, referred to hereafter as "memory unit address." When an instruction that stores data is executed, a bus address defined by the instruction is used to obtain a memory unit address, which identifies the memory location where the data is actually to be stored. In this regard, a mapper is often employed that maps or translates the bus address into a memory unit address having a different value than the bus address. There are various advantages associated with utilizing bus addresses that are mapped into different memory unit addresses.

For example, many computer applications are programmed such that the bus addresses are used consecutively. In other words, one of the bus addresses is selected as the bus address to be first used to store data. When a new bus address is to be utilized for the storage of data, the new bus address is obtained by incrementing the previously used bus address.

If consecutive bus addresses are mapped to memory unit addresses in the same memory unit, then inefficiencies may occur. In this regard, a finite amount of time is required to store and retrieve data from a memory unit. If two consecutive data stores occur to the same memory unit, then the second data store may have to wait until the first data store is complete before the second data store may occur. However, if the two consecutive data stores occur in different memory units, then the second data store may commence before the first data store is complete. To minimize memory latency and maximize memory bandwidth, consecutive bus addresses should access as many memory units as possible. This can also be described as maximizing the memory interleave.

As a result, the aforementioned mapper is often designed to map the bus addresses to the memory unit addresses such that each consecutive bus address is translated into a memory unit address in a different memory unit. For example, a bus address having a first value is mapped to a memory unit address identifying a location in a first memory unit, and the bus address having the next highest value is mapped to a memory unit address identifying a location in a second memory unit. Therefore, it is likely that two consecutive data stores from a single computer application do not occur in the same memory unit. In other words, it is likely that consecutive data stores from a computer application are interleaved across the memory units.

Backup systems are often employed to enable the recovery of data in the event of a failure of one of the memory units. For example, U.S. Pat. No. 4,849,978, which is incorporated herein by reference, describes a checksum backup system that may be used to recover the data of a failed memory unit. In this regard, one of the memory units is designated a checksum memory unit. Each address in the checksum memory unit is initialized to zero and is correlated with an address in each of the other non-checksum memory units. Each data value being stored in an address of one of the non-checksum memory units is exclusively ored with the data value previously stored in the foregoing address. The result of this exclusive or operation is then exclusively ored with the value, referred to as a "checksum value," in the correlated address of the checksum memory unit. The result of this exclusive or operation is then stored in the foregoing correlated address of the checksum memory unit as a new checksumn value.

When a memory unit fails, the value of an address in the failed memory unit can be recovered by exclusively oring the checksum value in the correlated address of the checksum memory unit with each of the values in the other memory units that are correlated with the foregoing checksum value. Although checksum backup systems enable the recovery of data from a failed memory unit, the process of maintaining the checksum values can cause some inefficiencies, since the checksum memory unit should be updated for each data store that occurs in a non-checksum memory unit.

Thus, a heretofore unaddressed need exists in the industry for providing a more efficient data storage system and method. It is desirable for the data storage system and method to include a backup system with minimal adverse impact to the overall performance of the data storage system and method.

SUMMARY OF THE INVENTION

The present invention overcomes the inadequacies and deficiencies of the prior art as discussed hereinbefore. Generally, the present invention provides a data storage system and method for mapping bus addresses to memory unit addresses such that data value and checksum value stores associated with consecutive bus addresses occur in an interleaved fashion.

In architecture, the data storage system of the present invention utilizes a plurality of memory systems, at least one processor, and a mapping system. Each of the memory systems has memory and a memory controller for storing and retrieving data. The processor transmits requests for writing data values. These requests include bus addresses. The mapping system maps the bus addresses into memory addresses, such as the memory unit addresses previously described. The mapping system maps consecutive bus addresses such that the memory addresses mapped from the consecutive bus addresses are interleaved across a plurality of the memory systems. In response to the foregoing requests from the processor, the mapping system identifies checksum system identifiers that identify locations where checksum values to be updated based on the aforementioned data values are stored. The checksum system identifiers preferably identify each of the plurality of mapping systems so that the checksum identifiers and, therefore, the checksum updates that occur based on these checksum system identifiers are interleaved across these memory systems.

In accordance with another feature of the present invention, the mapping system optionally, but preferably, includes two mappers. One mapper maps the bus addresses to memory addresses, as described above. The other mapper maps the bus addresses to access keys that may be used to prevent unauthorized data accesses. This optional feature enables the memory of the memory systems to be allocated more efficiently.

The present invention can also be viewed as providing a method for interleaving data values and checksums across memory systems. The method can be broadly conceptualized by the following steps: providing memory systems, each of the memory systems having memory and a memory controller for storing and retrieving data; receiving requests to write data values, the requests including consecutive bus addresses; mapping the consecutive bus addresses into memory addresses; identifying each of a plurality of the memory systems based on the memory addresses; selecting checksum system identifiers in response to the requests to write data values; identifying each of the plurality of the memory systems based on the checksum system identifiers; and updating checksum values stored in each of the plurality of said memory systems based on the checksum identifiers.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1:
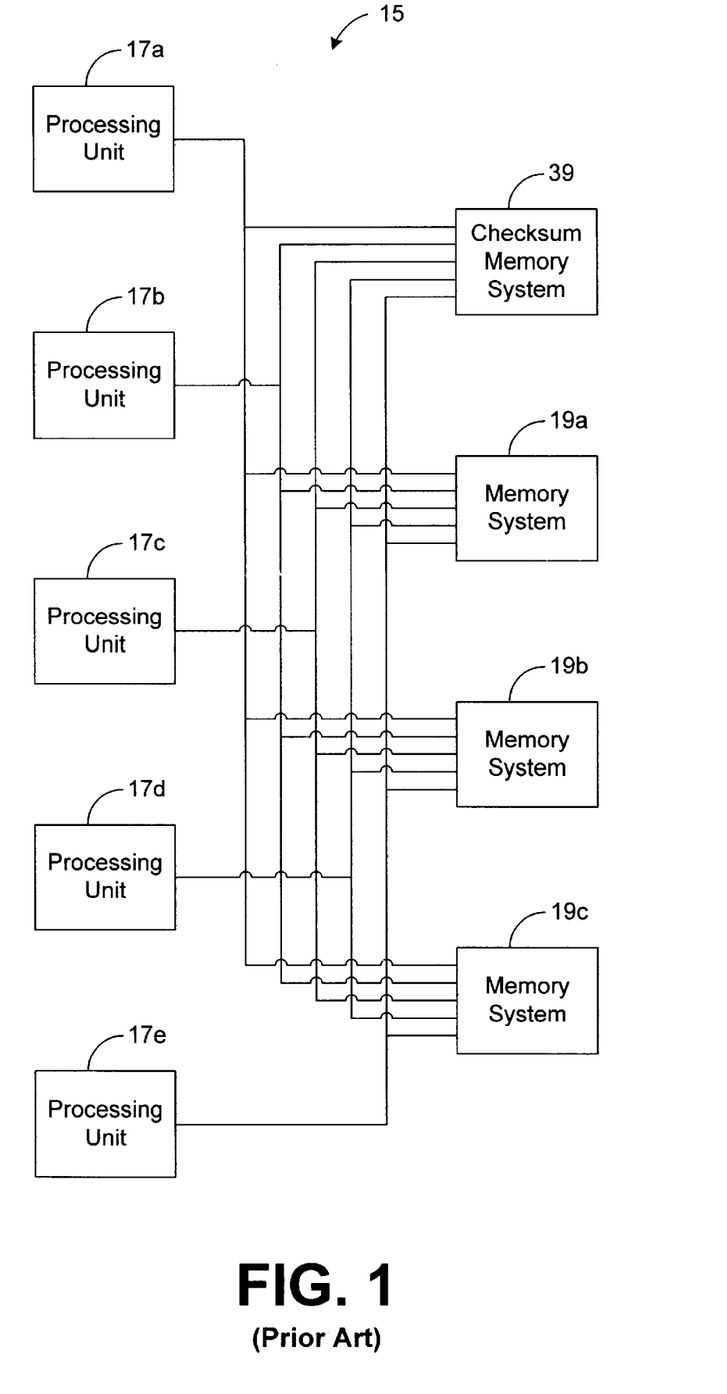
FIG. 1 is a block diagram illustrating a conventional processing system.
Figure 2:
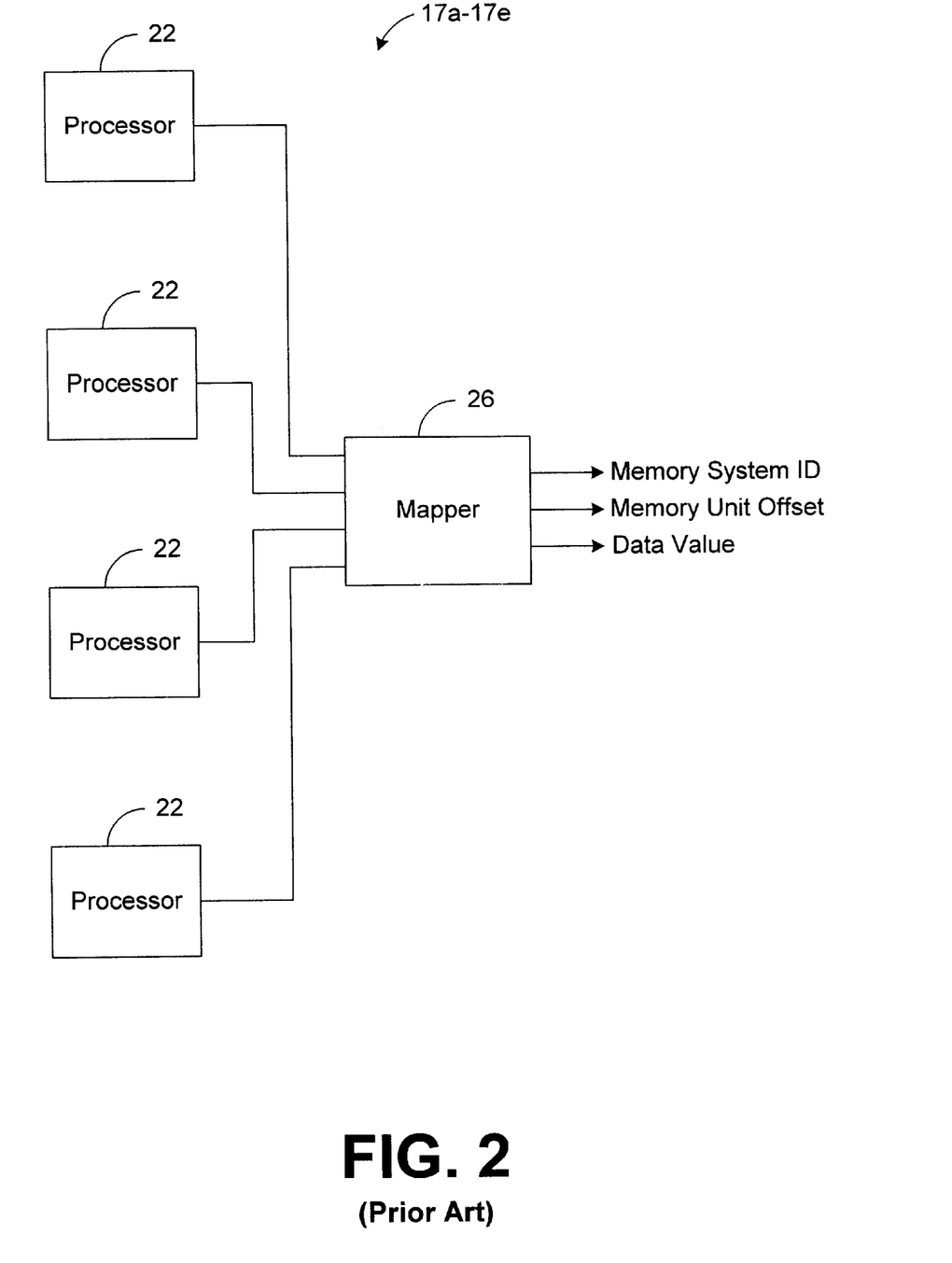
FIG. 2 is a block diagram illustrating a more detailed view of processing units depicted in FIG. 1.

FIG. 1 depicts a conventional processing system 15 including a plurality of processing units 17a–17e coupled to a plurality of memory systems 19a–19c. As shown by FIG. 2, each processing unit 17a–17e includes one or more processors 22 that are configured to execute instructions via techniques well known in the art. During execution, it is often necessary to retrieve and store data.

When a data value is to be stored in response to execution of an instruction by one of the processors 22, the processor 22 transmits a storage request to a mapper 26. The storage request includes the data value to be stored and a bus address indicative of where the foregoing data value is to be stored. The mapper 26 is configured to map the bus address into a memory unit address that includes a memory system identifier and a memory unit offset. The memory system identifier identifies one of the memory systems 19a–19c. The mapper 26 is configured to transmit a write request to each of the memory systems 19a–19c. The write request includes and is defined by the data value to be stored, the memory system identifier, and the memory unit offset.

Figure 3:
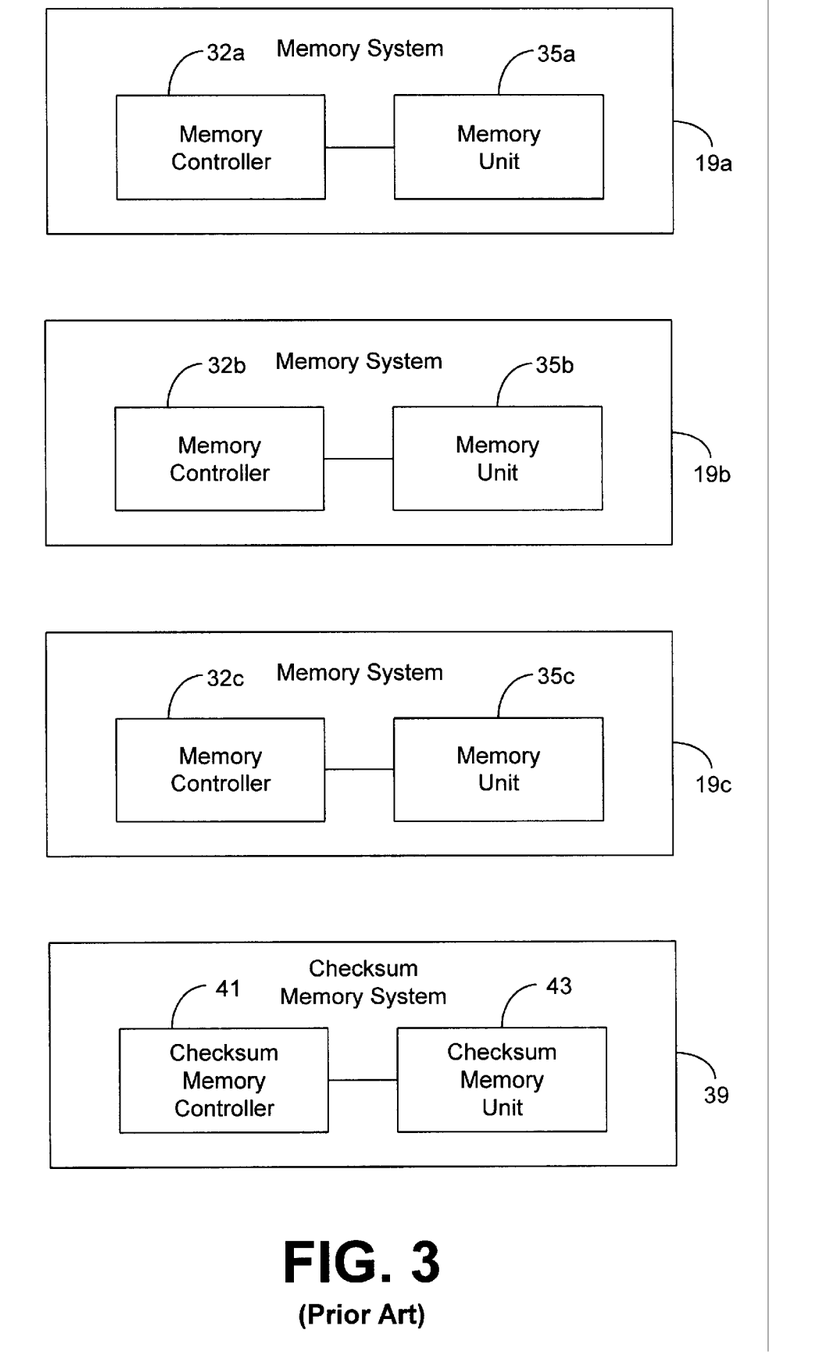
FIG. 3 is a block diagram illustrating a more detailed view of memory systems depicted in FIG. 1.

As shown by FIG. 3, each of the memory systems 19a–19c includes a memory controller 32a–32c, respectively, and a memory unit 35a–35c, respectively. Each of the memory units 35a–35c includes a plurality of memory locations where data can be stored and retrieved. The memory controller 32a, 32b, or 32c of the memory system 19a, 19b, or 19c identified by the aforementioned memory system identifier of the write request is configured to store the data value of the write request (i.e., the data value to be stored in response to the aforementioned storage request) into the memory unit 35a, 35b, or 35c of the identified memory system 19a, 19b, or 19c based on the memory unit offset. In this regard, the memory unit offset corresponds to a location in each of the memory units 35a–35c, and the memory controller 32a, 32b, or 32c in the identified memory system 19a, 19b, or 19c is configured to store the received data value of the write request at the memory unit location corresponding to the memory unit offset.

To increase the performance of the processing system 15, the mapper 26 is configured to map consecutive bus addresses across the different memory systems 19a–19c in an interleaved fashion. For example, assume that each bus address from processors 22 is eight bits of binary information and can range from 00000000 to 11111111. The first four consecutive memory addresses are 00000000, 00000001, 00000010, and 00000011. Programmers typically utilize the memory addresses in consecutive order. Therefore, if the address 00000000 is initially used to store a data value, then it is likely that address 00000001 will be the next new bus address used to store data. Then, it is likely that address 00000010 will be used followed by address 00000011. This pattern is likely to be continued until no more new bus addresses are needed or until all of the bus addresses have been used.

To map the foregoing consecutive bus addresses across the memory systems 19a–19c in an interleaved fashion, the mapper 26 may map the first bus address (00000000) to a memory unit address having a memory system identifier that identifies memory system 19a. The mapper 26 may then map the second bus address (00000001) to a memory unit address having a memory system identifier that identifies memory system 19b. The mapper 26 may then map the third bus address (00000010) to a memory unit address having a memory system identifier that identifies the remaining memory system 19c. This process is repeated for each new bus address received by mapper 26. For example, when the mapper 26 receives a storage request including the fourth bus address (00000011), the mapper 26 maps the fourth bus address to a memory unit address having a memory system identifier that identifies memory system 19a.

Each bus address mapped to the same memory system 19a, 19b, or 19c is preferably mapped into a memory unit address having a different memory unit offset. Therefore, although a set of bus addresses is mapped to the same memory system 19a, 19b, or 19c, each of the bus addresses is mapped to a unique memory unit address. Accordingly, each bus address of the foregoing set is mapped to a different location in the same memory system 19a, 19b, or 19c.

Through techniques similar to the techniques previously described herein, data may be retrieved from the memory systems 19a–19c. In this regard, when one of the processors 22 executes an instruction to retrieve data, a retrieval request is transmitted by the processor 22 to the mapper 26 coupled to the processor 22. The retrieval request includes the bus address that indicates where the data is to be retrieved. The mapper 26 maps the bus address to a memory unit address including a memory system identifier and a memory unit offset. The memory system identifier identifies the memory system 19a, 19b, or 19c storing the requested data, and the memory unit offset corresponds to the location within the memory unit 35a, 35b, or 35c of the identified memory system 19a, 19b, or 19c where the data is actually stored.

The mapper 26 transmits a read request to each of the memory systems 19a–19c in response to the retrieval request. The read request includes and is defined by the foregoing memory unit address translated from the bus address of the retrieval request. The memory controller 32a, 32b, or 32c of the memory system 19a, 19b, or 19c identified by the memory system identifier of the read request retrieves the data value in the associated memory unit 35a, 35c, or 35c at the location corresponding to the memory unit offset of the read request. The identified memory system 19a, 19b, or 19c then transmits the retrieved data value to the requesting processing unit 17a, 17b, 17c, 17d, or 17e. In this regard, the memory controller 32a, 32b, or 32c may return the retrieved data value to the mapper 26, which transmits this data value to the requesting processor 22 (i.e., the processor 22 that issued the aforementioned retrieval request), or the memory controller 32a, 32b, or 32c may transmit the data value to the requesting processor 22 without utilizing mapper 26.

As shown by FIG. 1, the processing system 15 also includes a checksum memory system 39 coupled to the processing units 17a–17e. As shown by FIG. 3, the checksum memory system 39, in architecture, is configured similar to the other memory systems 19a–19c. More specifically, the checksum memory system 39 includes a checksum memory controller 41 and a checksum memory unit 43. The checksum memory controller 41 is designed to store and retrieve data based on a memory unit address received by the checksum memory system 39. The checksum of each memory unit location in memory systems 19a–19c corresponding to the same memory unit offset is maintained in the memory unit location of the checksum memory unit 39 corresponding to the foregoing memory unit offset.

In this regard, the values in the checksum memory unit 43 are initialized to zero. Each write request transmitted by any of the processing units 17a–17e is transmitted to the other memory systems 19a–19c. As previously set forth, the memory controller 32a, 32b, or 32c of the memory system 19a, 19b, or 19c identified by the memory unit address of a transmitted write request is configured to store a data value of the write request into a memory unit location corresponding to the memory unit offset of the memory unit address. The memory controller 32a, 32b, or 32c of the identified memory system 19a, 19b, or 19c is also designed to exclusively or the foregoing data value of the write request with the data value previously stored in the foregoing memory location (i.e., with the data value overwritten in response to the write request). The foregoing memory controller 32a, 32b, or 32c then transmits to the checksum memory system 39 the result of this exclusive or operation and the memory unit offset correlated with the foregoing memory location (i.e., the location in the identified memory system 19a, 19b, or 19c accessed in response to the write request).

The checksum controller 41 is configured to exclusively or this result with the data value presently stored in the checksum memory unit location corresponding to the received memory unit offset (i.e., the memory unit offset included in the write request). The checksum memory controller 41 then stores the result of this exclusive or operation into the foregoing location of the checksum memory unit 43 (i.e., the checksum memory unit location corresponding to the received memory unit offset). Accordingly, the location in the checksum memory unit 43 corresponding to a particular memory unit offset should be storing the checksum of the data values presently stored in the locations of memory units 35a–35c that correspond to the particular memory unit offset.

If any of the memory systems 19a–19c fail, then the data values stored in the failed memory system 19a, 19b, or 19c can be recovered by using the data values in the checksum memory system 39. To recover a data value stored in failed memory system 19a, 19b, or 19c, each data value in each of the other operable memory systems 19a–19c at a memory unit location corresponding to the same memory unit offset is exclusively ored with the checksum data value stored in the checksum memory unit 39 at the location corresponding to the foregoing memory unit offset. The result of these exclusive or operations should be the data value stored in the failed memory system 19a, 19b, or 19c at the memory unit location corresponding to the same memory unit offset. Therefore, by performing the foregoing exclusive or operations for each memory unit offset, each of the data values stored in the failed memory system 19a, 19b, or 19c can be recovered. Using checksum values to recover data values from failed memory systems is well known in the art.

Often, the processing units 17a–17e are grouped into protection domains to protect the data produced by applications running on the processing units 17a–17e. As will be described in further detail hereinbelow, a first processing unit grouped into one protection domain is typically allowed to access data only in a certain set of memory locations, and a second processing unit grouped into another protection domain is typically allowed to access data only in another set of memory locations. Thus, by assigning the two processing units to different protection domains, the first processing unit can be prevented from accessing the data stored by the second processing unit.

For example, two of the processing units 17a and 17b could be assigned to one protection domain (PD1) and execute instructions from applications running on one operating system, and another processing unit 17c could be assigned to another protection domain (PD2) and execute instructions from applications running on another operating system. Similarly, processing units 17d and 17e could be assigned, respectively, to two protection domains (PD3 and PD4) and execute instructions from applications running on other operating systems. The processing system 15 may include any number of processing units and protection domains. However, each processing unit 17a–17e is usually assigned to only one protection domain.

The data locations in the memory units 35a–35c are also assigned to protection domains, and a processing unit 17a, 17b, 17c, 17d, or 17e assigned to one protection domain may access a particular data location only if the particular data location is in the same protection domain. Generally, it is often desirable to prevent an application running on one processing unit 17a, 17b, 17c, 17d, or 17e from accessing a data value produced by another application running on another processing unit 17a, 17b, 17c, 17d, or 17e. This may be accomplished by storing the data value in a location assigned to the same protection domain as the one processing unit 17a, 17b, 17c, 17d, or 17e assuming that the other processing unit 17a, 17b, 17c, 17d, or 17e is not assigned to the same protection domain. The concept of assigning protection domains to data locations and processing units to prevent unauthorized data accesses is generally well known in the art.

Figure 4:
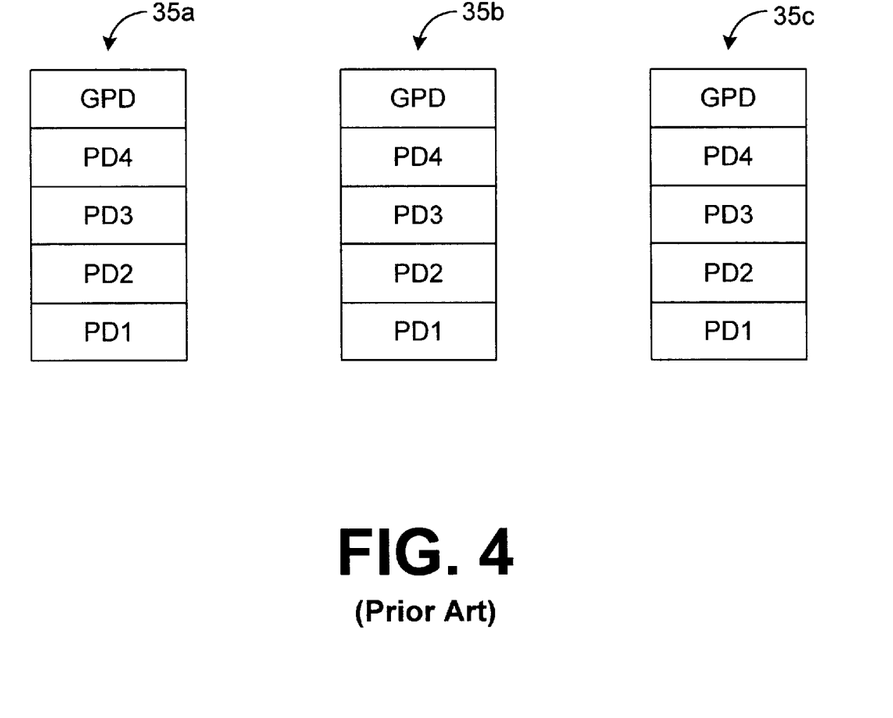
FIG. 4 is a block diagram illustrating a more detailed view of memory units depicted in FIG. 3.

FIG. 4 shows each memory unit 35a–35c from each of the memory systems 19a–19c. As shown, by FIG. 4, each of the memory units 35a–35c includes blocks of contiguous memory. Each of the memory blocks in the memory units 35a–35c is assigned to a particular protection domain. For example, as described above, assume that the processing system 15 is configured to support four protection domains (PD 1 PD4). In this example, assume that two of the processing units 17a and 17b are associated with one of the protection domains (PD1) and that processing units 17c–17e are respectively associated with the other three protection domains (PD2–PD4).

As shown by FIG. 4, each of the memory units 35a–35c includes at least one block of memory assigned exclusively to each protection domain. As used herein, a "memory block" may be one memory location or a set of contiguous memory locations. Note that when a memory block includes a plurality of memory locations, each memory location in the block should correspond to a different memory unit offset. Furthermore, no two memory locations in any one memory unit 35a, 35b, or 35c should correspond to the same memory unit offset.

Only a processing unit 17a, 17b, 17c, 17d, or 17e from a particular protection domain may access a location in a block of memory assigned to the same protection domain. Therefore, processing units 17a and 17b, for example, may store or read data in the blocks of memory assigned to PD1 but may not store or read data in the blocks of memory assigned to PD2–PD4. As result, the data stored in a memory block assigned to one of the protection domains PD1–PD4 is protected from corruption by a processing unit 17a, 17b, 17c, 17d, or 17e in another protection domain.

Each of the memory units 35a–35c also includes at least one block of memory assigned to a global protection domain (GPD). Any of the processing units 17a–17e may access any of the locations in the memory blocks assigned to the GPD. In other words, each memory block assigned to the GPD is shared memory. Therefore, any of the processing units 17a–17e may store or read data in any of the locations in the memory blocks assigned to the GPD. Since any of the processing units 17a–17e may access the memory locations in the memory blocks assigned to the GPD, the processing units 17a–17e should only store in these memory blocks global data that may be accessed by processing units 17a–17e in different protection domains.

As previously set forth, each mapper 26 is usually assigned to only one protection domain other than the GPD. Therefore, each mapper 26 in each of the processing units 17a–17e only needs to map bus addresses to memory unit addresses identifying memory unit locations assigned to the same protection domain as the processing unit 17a, 17b, 17c, 17d, or 17e of the mapper 26. Accordingly, the number of mappings in each mapper 26 is significantly less than the number of locations in all of the memory units 35a–35c.

In order to maintain the interleaving of consecutive bus addresses across memory systems 19a–19c according to the techniques described above, memory locations in the memory units 35a–35c corresponding to the same memory unit offset are assigned to the same protection domain. Therefore, the memory blocks assigned to the same protection domain in FIG. 4 should be the same size and include memory unit locations corresponding to the same memory unit offsets. This remains true when additional memory systems (not shown) and, therefore, memory units (not shown) are added to the processing system 15. While some protection domains may need the additional memory space provided by additional memory units, other protection domains may not. Therefore, including additional memory units into the system 15 may needlessly allocate a significant amount of memory to a protection domain that does not need the additional memory space.

In addition, to reduce the amount of data stored in the mappers 26, each mapper 26 may be designed to calculate or derive the memory unit addresses from the bus addresses. For example, each mapper 26 may include a plurality of entries in which each entry is associated with a block of contiguous memory in one of the memory units 35a, 35b, or 35c. Thus, an entry correlated with a particular one of the blocks of contiguous memory assigned to a single protection domain includes the memory system identifier that identifies the memory system 19a, 19b, or 19c in which the particular block of memory resides. The entry also includes a memory unit offset corresponding to one of the memory locations (e.g., the first memory location) in the block of contiguous memory. In translating a bus address into a memory unit address identifying another location within the block of contiguous memory, the foregoing memory unit offset stored in the entry may be used to calculate or derive, based on the bus address, the memory unit offset of the other location that is to be accessed. Thus, the memory unit address of each location in the block of contiguous memory does not need to be stored in the mapper 26.

Each entry also may include an access key unique to the protection domain assigned to the block of contiguous memory. The access key in an entry is transmitted along with a memory unit address translated via the same entry. Thus, when receiving a request to access a memory location, a memory controller 32a, 32b, or 32c should not only receive the memory unit address of the location to be accessed, but the memory controller 32a, 32b, or 32c should also receive an access key unique to the protection domain assigned to location to be accessed. The memory controller 32a, 32b, or 32c is aware of which blocks of contiguous memory have been assigned to which protection domains, and if the access key received along with a memory unit address does not identify the protection domain of the location identified by the memory unit address, then the memory controller 32a, 32b, or 32c refrains from accessing the foregoing location. Thus, analysis of the access keys received along with the memory unit addresses helps to ensure that unauthorized data accesses do not occur.

Figure 5:
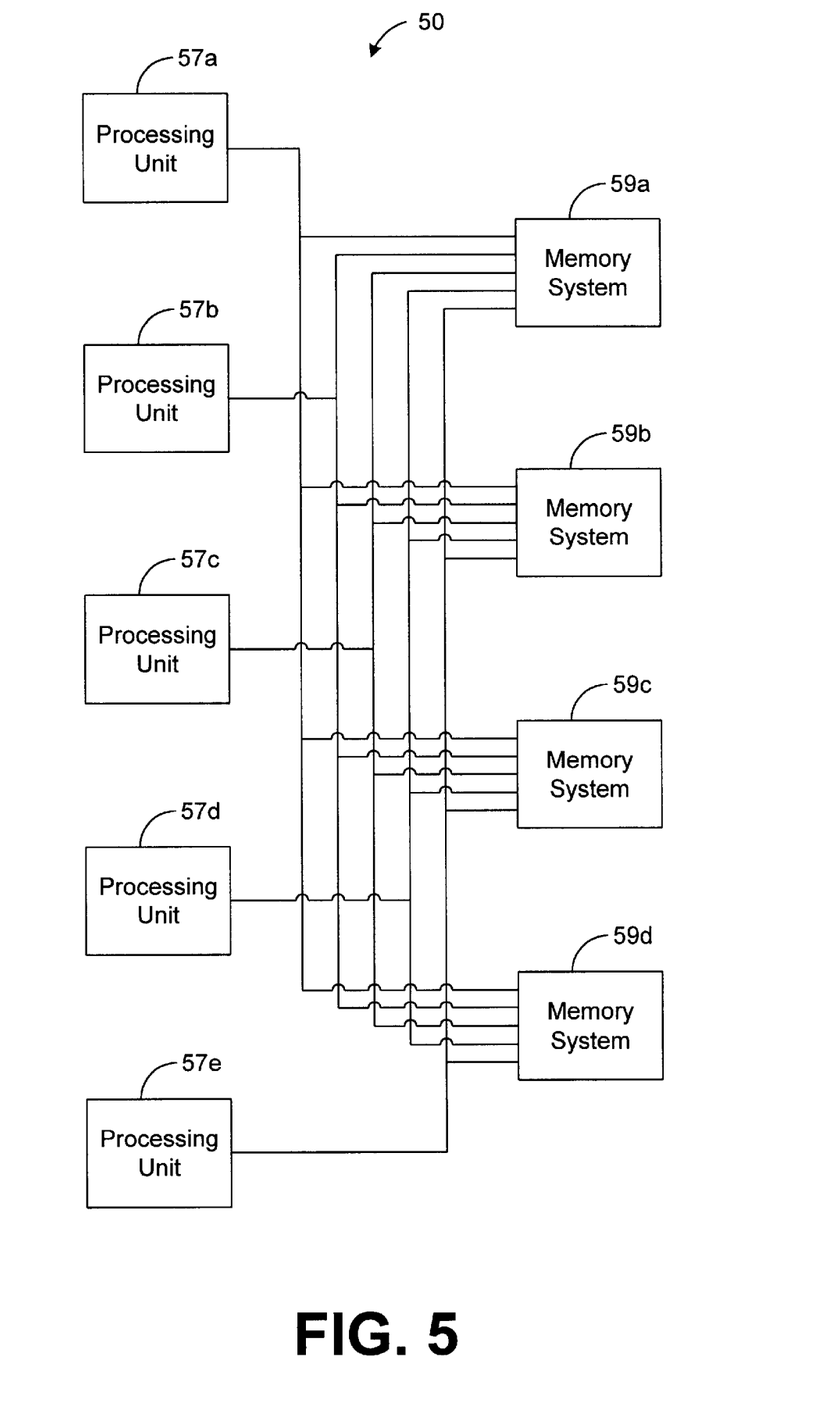
FIG. 5 is a block diagram illustrating a processing system in accordance with the present invention.
Figure 6:
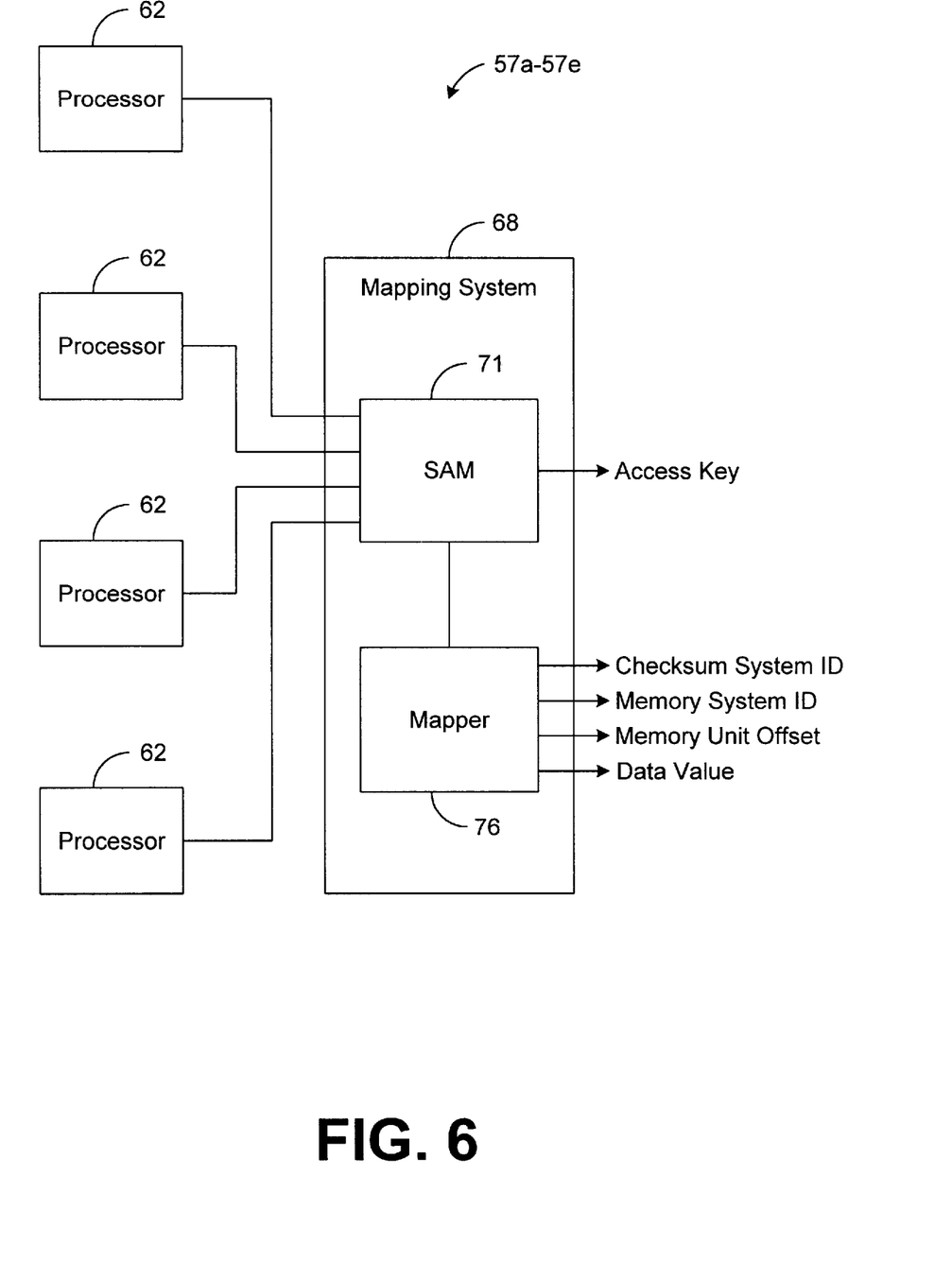
FIG. 6 is a block diagram illustrating a more detailed view of processing units depicted in FIG. 5.

FIG. 5 depicts an improved processing system 50 in accordance with the present invention. Similar to conventional processing system 15, the processing system 50 includes one or more processing units 57a–57e. Each of the processing units 57a–57e is preferably coupled to each of a plurality of memory systems 59a–59d. As shown by FIG. 6, each processing unit 57a–57e includes one or more processors 62 that are configured to execute instructions via techniques well know in the art. During execution, it is often necessary to retrieve and store data.

When data is to be stored in response to execution of an instruction by one of the processors 62, the processor 62 transmits a storage request to a mapping system 68. The mapping system 68 preferably includes a system address mapper (SAM) 71 and a mapper 76. The storage request includes the data value to be stored and a bus address indicative of where the foregoing data is to be stored.

The SAM 71 preferably includes a larger number of entries than the mapper 76, which will be described in further detail hereinbelow. Each entry of the SAM 71 includes an access key identifying one of the protection domains. The bus address of each received storage request is preferably mapped to one of the entries of the SAM 71. The bus addresses that will be translated into memory unit addresses having the same memory unit offset are preferably mapped to the same entry. In response to a storage request, the SAM 71 is configured to transmit the access key mapped from the bus address of the storage request.

The SAM 71 is further configured to transmit the storage request to mapper 76. Similar to conventional mapper 26, the mapper 76 is configured to map the bus address of the storage request into a memory unit address that identifies a memory unit location in one of the memory systems 59a, 59b, 59c, or 59d. More specifically, the memory unit address includes a memory system identifier that identifies one of the memory systems 59a, 59b, 59c, or 59d and a memory unit offset that corresponds to a memory unit location in the identified memory system 59a, 59b, 59c, or 59d. Similar to conventional mapper 26, the mapper 76 is configured to simultaneously transmit the data value to be stored, the memory system identifier, and the memory unit offset to each of the memory systems 59a–59d. Furthermore, the SAM 71 is configured to transmit to each of the memory systems 59a–59d the aforementioned access key along with the memory system identifier, the memory unit offset, and the data value transmitted by mapper 76.

In the preferred embodiment, the aforementioned memory system identifier, memory unit offset, and data value to be stored are simultaneously (i.e., during the same clock cycle) transmitted to the memory systems 59a–59d as a write request from the transmitting processing unit 57a, 57b, 57c, 57d, or 57e. Included in this write request is a checksum system identifier, which will be described in fuirther detail hereinafter.

Figure 7:
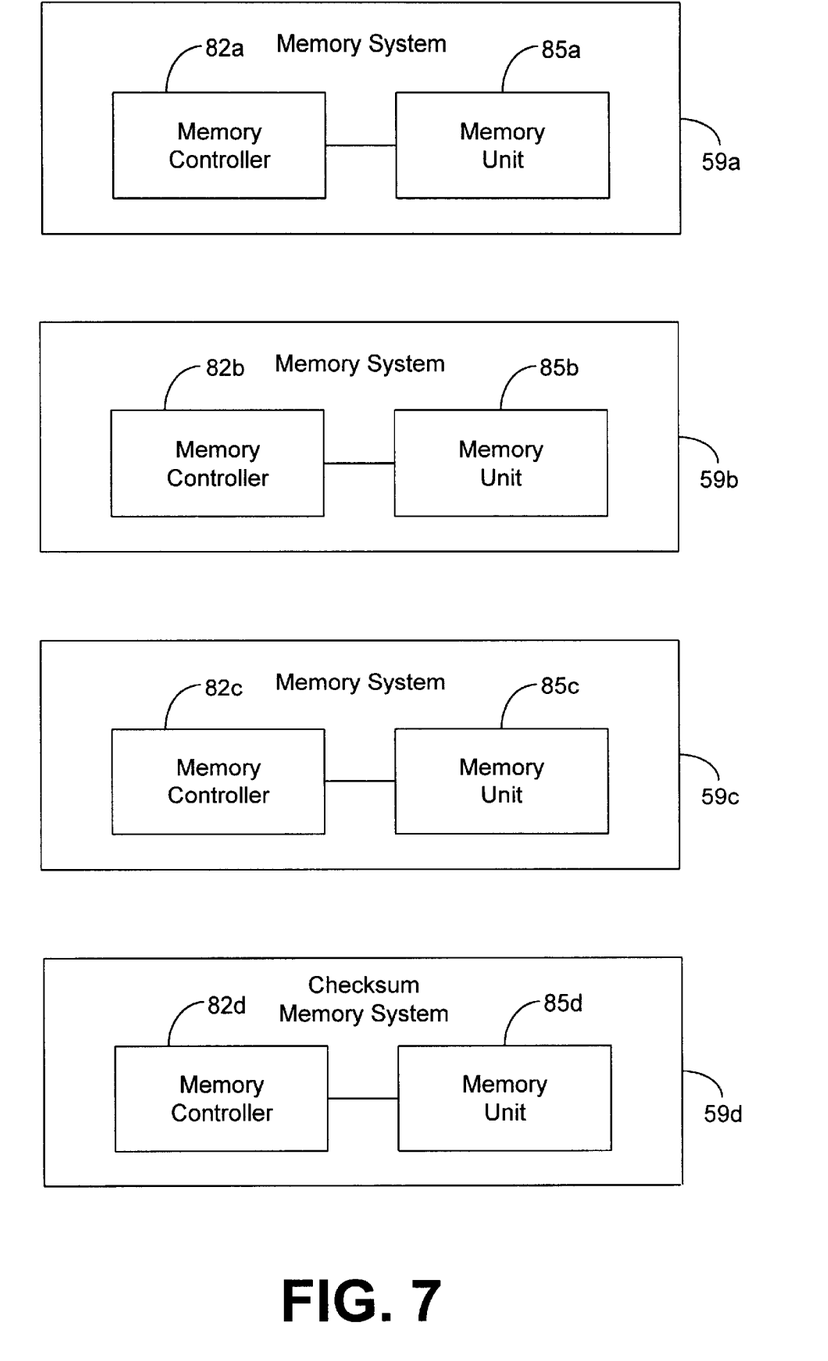
FIG. 7 is a block diagram illustrating a more detailed view of memory systems depicted in FIG. 5.

Furthermore, the mapper 76 may utilize conventional techniques to translate a bus address into a memory unit address. In this regard, to reduce the amount of data stored in the mappers 76, the mapper 76 is preferably designed to calculate or derive the memory unit offsets from the bus addresses. For example, the mapper 76 preferably includes a plurality of entries in which each entry is respectively associated with a block of contiguous memory in one of the memory units 85a, 85b, 85c or 85d. Thus, an entry correlated with a particular one of the blocks of contiguous memory includes the memory system identifier that identifies the memory system 59a, 59b, 59c or 59d in which the particular block of memory resides. The entry also includes a memory unit offset corresponding to one of the memory locations (e.g., the first memory location) in the block of contiguous memory. In translating a bus address into a memory unit address identifying another location within the block of contiguous memory, the foregoing memory unit offset stored in the foregoing entry may be used to calculate or derive, based on the bus address, the memory unit offset of the other location that is to be accessed. Thus, the memory unit offset of each location in the block of contiguous memory does not need to be stored in the mapper 76.

As shown by FIG. 7, each of the memory systems 59a–59d includes a memory controller 82a–82d, respectively, and a memory unit 85a–85d, respectively. Each of the memory units 85a–85d includes a plurality of memory locations where data can be stored and retrieved. The memory controller 82a, 82b, 82c, or 82d of the memory system 59a, 59b, 59c, or 59d identified by the aforementioned memory system identifier of the write request is configured to store the data value of the write request (i.e., the data value to be stored in response to the foregoing storage request) into memory unit 85a, 85b, 85c, or 85d of the identified memory system 59a, 59b, 59c, or 59d based on the memory unit offset. In this regard, the memory unit offset corresponds to a location in each of the memory units 85a–85d, and the memory controller 82a, 82b, 82c, or 82d in the identified memory system 59a, 59b, 59c, or 59d is configured to store in the foregoing memory unit 85a, 85b, 85c, or 85d the data value of the write request at the memory unit location corresponding to the memory unit offset.

Similar to conventional mapper 26, the mapper 76 of the present invention is configured to map consecutive bus addresses across the different memory systems 59a–59d in an interleaved fashion. However, unlike conventional mapper 26, the mapper 76 of the present invention is further configured to map checksums across the different memory systems 59a–59d in an interleaved fashion as well.

Figure 8:
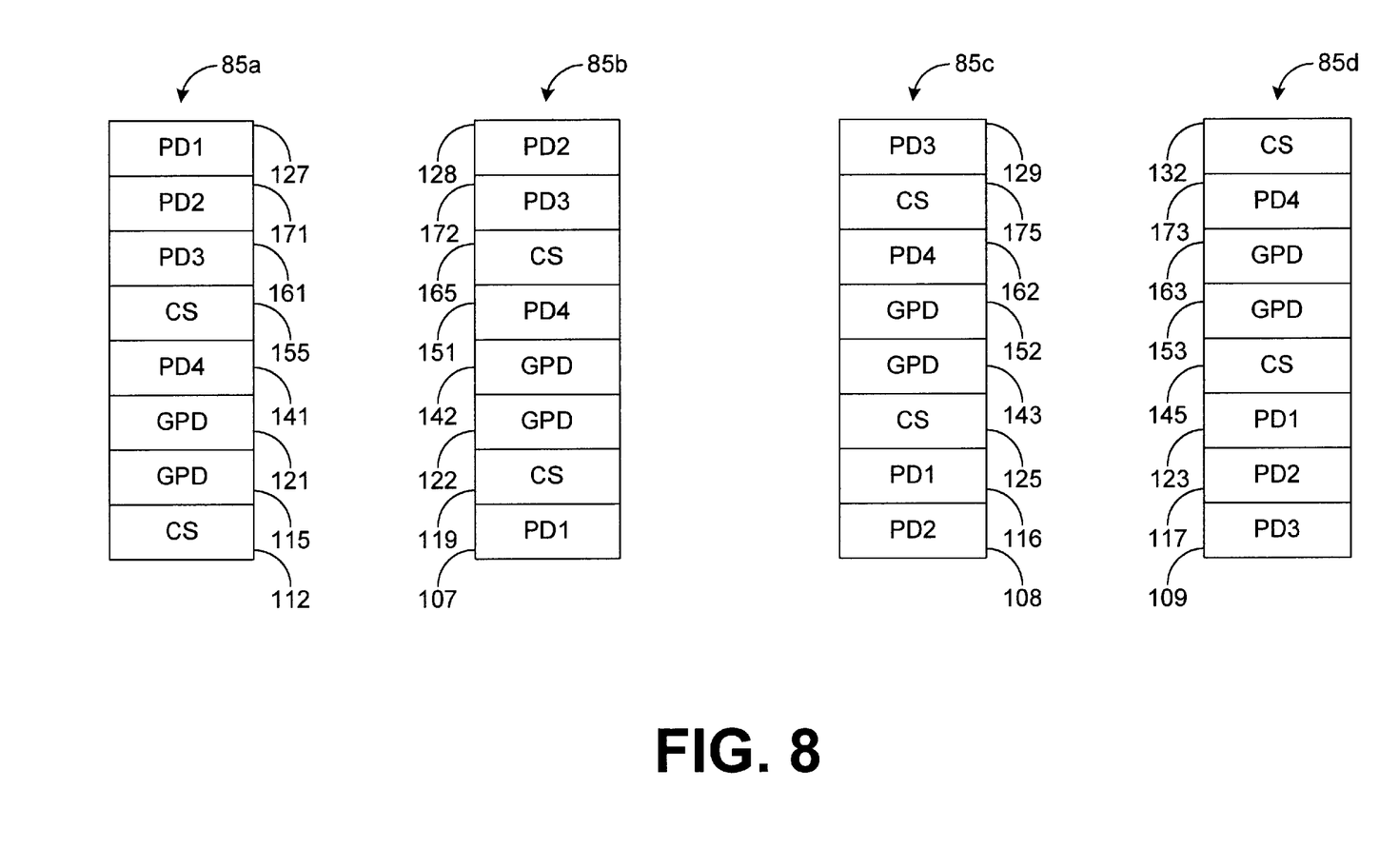
FIG. 8 is a block diagram illustrating a more detailed view of memory units depicted in FIG. 7.

To illustrate how the foregoing may be accomplished, refer to FIG. 8, which depicts a more detailed view of the memory units 85a–85d of memory systems 59a–59d, respectively. Assume that the processors 62 of processing units 57a and 57b are associated with or assigned to a first protection domain (PD1), that the processors 62 of processing unit 57c are associated with or assigned to a second protection domain (PD2), that the processors 62 of processing unit 57d are associated with or assigned to a third protection domain (PD3), and that the processors 62 of processing unit 57e are associated with or assigned to a fourth protection domain (PD4). As shown by FIG. 8, each memory unit 85a–85d includes at least one block of memory allocated to each of the four protection domains and may include one or more blocks of memory allocated to the global protection domain. Each memory unit 85a–85d also includes at least one block of memory, referred to hereafter as a "checksum memory block," allocated for checksum storage, as will be further described in detail hereinafter.

Assume that the first four consecutive bus addresses utilized by the processors 62 in the first protection domain (PD1) and transmitted to SAM 71 are 00000000, 00000001, 00000010, and 00000011. The mapper 76 is configured to interleave the bus addresses across the memory systems 59a–59d or, in other words, to respectively map each of the foregoing bus addresses to PD1 memory blocks in different memory units 85a–85d. Furthermore, the mapper 76 is also configured to respectively map the foregoing bus addresses to checksum system identifiers, identifying the memory systems 59a–59d where the corresponding checksums are stored. Therefore, for each bus address mapped to a particular memory unit 85a–85d of a particular memory system 59a, 59b, 59c, or 59d, the checksum system identifier mapped from the same bus address identifies a different memory system 59a, 59b, 59c, or 59d.

For example, as previously set forth, it is desirable for simplicity to store the checksum associated with a particular memory unit location in a checksum memory unit location corresponding to the same memory unit offset as the particular memory unit location. Therefore, in FIG. 8, the checksum of the values stored in memory blocks 107–109 at locations corresponding to a particular memory unit offset is preferably stored in the checksum memory block 112 of memory unit 85a at the location corresponding to the same memory unit offset. Furthermore, the checksum of the values stored in memory unit blocks 115–117 at locations corresponding to a particular memory unit offset is preferably stored in the checksum memory block 119 of memory unit 85b at the location corresponding to the same memory unit offset. The checksum of the values stored in memory unit blocks 121–123 at locations corresponding to a particular memory unit offset is preferably stored in the checksum memory block 125 of memory unit 85c at the location corresponding to the same memory unit offset. Additionally, the checksum of the values stored in memory unit blocks 127–129 at locations corresponding to a particular memory unit offset is preferably stored in the checksum memory block 132 of memory unit 85d at the locations corresponding to the same memory unit offset. Similarly, the checksums of the values stored in memory unit blocks 141–143, 151–153, 161–163, and 171–173 are preferably stored in the checksum memory blocks 145, 155, 165, and 175, respectively. The data values at each of the locations in the checksum memory blocks 112, 119, 125, 145, 155, 165, 175, and 132 should be set to zero at initialization so that the values stored in the different memory units 85a–85d can be recovered according to techniques described herein when one of the memory systems 59a–59d fails.

To better illustrate the foregoing concepts, assume that the mapper 76 maps the first bus address (i.e., address 00000000) from the processors 62 of the first protection domain to memory block 107. In response to a storage request from one of the foregoing processors 62 to store a data value at bus address 00000000, the mapper 76 transmits a write request to each of the memory systems 59a–59d. The write request includes the foregoing data value and a memory unit address having a memory system identifier identifying memory system 59b. The memory unit address of the write request also includes a memory unit offset corresponding to a location within memory block 107 where the data value is to be stored. The write request also includes a checksum system identifier that identifies the memory system 59a having the checksum memory block 112 where the checksum associated with the foregoing memory unit location in memory block 107 resides.

The memory system 59b receives the foregoing write request. Since the memory system identifier of the write request identifies the memory system 59b, the memory controller 82b of the memory system 59b stores the aforementioned data value in memory block 107 at the location corresponding to the memory unit offset.

In addition to storing the aforementioned data value in the identified memory location, the memory controller 82b also exclusively ors the aforementioned data value with the data value previously residing in the identified memory location. The memory controller 82b then transmits, as a new write request, the result of this exclusive or operation to the other memory systems 59a, 59c, and 59d along with the checksum system identifier and memory unit offset received in the write request from mapper 76. In response, the memory controller 82a of the memory system 59a identified by the checksum system identifier is configured to update the checksum value located in the corresponding memory unit 85a at the location corresponding to the memory unit offset in the new write request. In other words, the memory controller 82a updates the checksum value corresponding to the data value just stored by the memory system 59b.

In updating the checksum value, the memory controller 82a exclusively ors the checksum value with the exclusive or operation result that is included in the new write request. The memory controller 82a then overwrites the checksum value in memory unit 85a with the result of this exclusive or operation performed by memory controller 82a. Thus, the updated checksum value may be used according to the techniques described herein to recover any of the data values presently stored in any of the other memory units 85b–85d at locations corresponding to the same memory unit offset. In other words, the updated checksum value should represent the checksum, as updated for the aforementioned data value stored in memory block 107, of the values stored at the locations in memory units 85b–85d corresponding to the same memory unit offset.

The second bus address (i.e., address 00000001) should be the next consecutive bus address utilized by the processors 62 of the first protection domain. To interleave the consecutive bus addresses across the memory units 85a–85d, the mapper 76 preferably maps the second bus address to memory block 116 of memory unit 85c. Therefore, in response to a storage request from one of the foregoing processors 62 to store a data value at bus address 00000001, the mapper 76 transmits a write request to each of the memory systems 59a–59d. The write request includes the foregoing data value and a memory unit address having a memory system identifier identifying memory system 59c. The memory unit address of the write request also includes a memory unit offset corresponding to a location within memory block 116 where the data value is to be stored. In addition, the write request includes a checksum system identifier that identifies the memory system 59b having the checksum memory block 119 where the checksum associated with the foregoing memory unit location in memory block 116 resides.

The memory system 59c receives the foregoing write request. Since the memory system identifier of the write request identifies the memory system 59c, the memory controller 82c of the memory system 59c stores the aforementioned data value in memory block 116 at the location corresponding to the memory unit offset.

In addition to storing the aforementioned data value in the identified memory location, the memory controller 82c also exclusively ors the aforementioned data value with the data value previously residing in the identified memory location. The memory controller 82c then transmits, as a new write request, the result of this exclusive or operation to the other memory systems 59a, 59b, and 59d along with the checksum system identifier and memory unit offset received in the write request from mapper 76. In response, the memory controller 82b of the memory system 59b identified by the checksum system identifier is configured to update the checksum value located in the corresponding memory unit 85b at the location corresponding to the memory unit offset in the new write request. In other words, the memory controller 82b updates the checksum value corresponding to the data value just stored by the memory system 59c.

In updating the checksum value, the memory controller 82b exclusively ors the checksum value with the exclusive or operation result that is included in the new write request. The memory controller 82b then overwrites the checksum value in memory unit 85b with the result of this exclusive or operation performed by memory controller 82b. Thus, the updated checksum value may be used according to the techniques described herein to recover any of the data values presently stored in any of the other memory units 85a, 85c, and 85d at locations corresponding to the same memory unit offset. In other words, the updated checksum value should represent the checksum, as updated for the aforementioned data value stored in memory block 116, of the values stored at the locations in memory units 85a, 85c, and 85d corresponding to the same memory unit offset.

The third bus address (i.e., address 00000010) should be the next consecutive bus address utilized by the processors 62 of the first protection domain. To interleave the consecutive addresses across the memory units 85a–85d, the mapper 76 preferably maps the third bus address to memory block 123 of memory unit 85d. Therefore, in response to a storage request from one of the foregoing processors 62 to store a data value at bus address 00000010, the mapper 76 transmits a write request to each of the memory systems 59a–59d. The write request includes the foregoing data value and a memory unit address having a memory system identifier identifying memory system 59d. The memory unit address of the write request also includes a memory unit offset corresponding to a location within memory block 123 where the data value is to be stored. In addition, the write request includes a checksum system identifier that identifies the memory system 85c having the checksum memory block 125 where the checksum associated with the foregoing memory unit location in memory block 123 resides.

The memory system 59d receives the foregoing write request. Since the memory system identifier of the write request identifies the memory system 59d, the memory controller 82d of the memory system 59d stores the aforementioned data value in memory block 123 at the location corresponding to the memory unit offset.

In addition to storing the aforementioned data value in the identified memory location, the memory controller 82d also exclusively ors the aforementioned data value with the data value previously residing in the identified memory location. The memory controller 82d then transmits, as a new write request, the result of this exclusive or operation to the other memory systems 59a–59c along with the checksum system identifier and memory unit offset received in the write request from mapper 76. In response, the memory controller 82c of the memory system 59c identified by the checksum system identifier is configured to update the checksum value located in the corresponding memory unit 85c at the location corresponding to the memory unit offset in the new write request. In other words, the memory controller 82c updates the checksum value corresponding to the data value just stored by the memory system 59b.

In updating the checksum value, the memory controller 82c exclusively ors the checksum value with the exclusive or operation result that is included in the new write request. The memory controller 82c then overwrites the checksum value in memory unit 85c with the result of this exclusive or operation performed by memory controller 82c. Thus, the updated checksum value may be used according to the techniques described herein to recover any of the data values presently stored in any of the other memory units 85a, 85b, and 85d at locations corresponding to the same memory unit offset. In other words, the updated checksum value should represent the checksum, as updated for the aforementioned data value stored in memory block 123, of the values stored at the locations in memory units 85a, 85b, and 85d corresponding to the same memory unit offset.

The fourth bus address (i.e., address 00000011) should be the next consecutive bus address utilized by the processors 62 of the first protection domain. To interleave the consecutive bus addresses across the memory units 85a–85d, the mapper 76 preferably maps the fourth bus address to memory block 127 of memory unit 85a. Therefore, in response to a storage request from one of the foregoing processors 62 to store a data value at bus address 00000011, the mapper 76 transmits a write request to each of the memory systems 59a–59d. The write request includes the foregoing data value and a memory unit address having a memory system identifier identifying memory system 59a. The memory unit address of the write request also includes a memory unit offset corresponding to a location within memory block 127 where the data value is to be stored. In addition, the write request includes a checksum system identifier that identifies the memory system 85d having the checksum memory block 132 where the checksum associated with the foregoing memory unit location in memory block 127 resides.

The memory system 59a receives the foregoing write request. Since the memory system identifier of the write request identifies the memory system 59a, the memory controller 82a of the memory system 59a stores the aforementioned data value in memory block 127 at the location corresponding to the memory unit offset.

In addition to storing the aforementioned data value in the identified memory location, the memory controller 82a also exclusively ors the aforementioned data value with the data value previously residing in the identified memory location. The memory controller 82a then transmits, as a new write request, the result of this exclusive or operation to the other memory systems 59b–59d along with the checksum system identifier and memory unit offset received in the write request from mapper 76. In response, the memory controller 82d of the memory system 59d identified by the checksum system identifier is configured to update the checksum value located in the corresponding memory unit 85d at the location corresponding to the memory unit offset in the new write request. In other words, the memory controller 82d updates the checksum value corresponding to the data value just stored by the memory system 59a.

In updating the checksum value, the memory controller 82d exclusively ors the checksum value with the exclusive or operation result that is included in the new write request. The memory controller 82d then overwrites the checksum value in memory unit 85d with the result of this exclusive or operation performed by memory controller 82d. Thus, the updated checksum value may be used according to the techniques described herein to recover any of the data values presently stored in any of the other memory units 85a–85c at locations corresponding to the same memory unit offset. In other words, the updated checksum value should represent the checksum, as updated for the aforementioned data value stored in memory block 127, of the values stored at the locations in memory units 85a–85c corresponding to the same memory unit offset.

As a result, not only are consecutive bus addresses interleaved across the memory units 85a–85d, but the storage of the checksums associated with the consecutive bus addresses are also interleaved across the memory units 85a–85d. In this regard, the checksums associated with consecutive bus addresses are stored in different memory units 85a–85d. For example, the checksum associated with the first memory address (i.e., address 00000000, which is mapped to memory block 107) is stored in checksum memory block 112 of memory unit 85a, and the checksum associated the next consecutive bus address (i.e., address 00000001, which is mapped to memory block 116) is stored in checksum memory block 119 of memory unit 85b. Therefore, when the bus addresses from the processors 62 of a particular protection domain are utilized consecutively, the checksum associated with consecutive bus addresses are stored in different memory units 85a–85d. As a result, it is likely that consecutive checksum stores will not occur to the same memory unit 85a–85d, thereby enabling optimum efficiency of the system 50 by preventing a first checksum store from delaying the next consecutive checksum store that is likely to occur for the same protection domain.

It should be noted that variations to the methodology described above are possible. For example, in transmitting a write request to satisfy a storage request received from one of the processors 62, it is not necessary for the mapper 76 to include a checksum system identifier in the write request. In this regard, the memory system 59a, 59b, 59c, or 59d identified by the memory system identifier in the write request may be configured to transmit to the mapper 76 the result of the exclusive or performed by the memory system 59a, 59b, 59c, or 59d. The mapper 76 may then transmit a write request for updating the appropriate checksum value. To this end, the mapper 76 should include the checksum system identifier in the foregoing write request. Other types of variations may be employed without departing from the principles of the present invention.

As previously set forth, the SAM 71 transmits an access key in response to a storage request. This access key is preferably transmitted to each memory system 59a–59d along with the write request that is transmitted, by the mapper 76, in response to the storage request. The access key should identify the protection domain assigned to the memory location identified by the memory unit address in the write request. The memory controllers 82a–82d in each of the memory systems 59a–59d store each access key that may be transmitted by the SAM 71 in any one of the processing units 57a–57e. Each of the memory controllers 82a–82d is aware of which protection domains are assigned to the memory locations accessible to the memory controller 82a–82d. Therefore, each of the memory controller 82a–82d is aware of which access key should be received along with a write request that identifies a memory location accessible to the memory controller 82a–82d.

As previously described, in response to a write request, the memory controller 82a, 82b, 82c, or 82d in the memory system 59a, 59b, 59c, or 59d identified by the memory system identifier of the write request should store the data value of the write request in the memory unit 85a, 85b, 85c, or 85d of the identified memory system 59a, 59b, 59c, or 59d. However, before storing this data value, the memory controller 82a, 82b, 82c, or 82d preferably compares the access key transmitted along with the write request to one or more of the access keys stored in the memory controller 82a, 82b, 82c, or 82d to ensure that the associated write request is authorized.

For example, assume that the data value to be written in response to a write request, based on the memory system identifier and the memory unit offset in the write request, is to be stored in memory block 107 of the memory unit 85b depicted by FIG. 8. In this regard, the memory system identifier in the write request identifies memory system 59b, and the memory unit offset in the write request corresponds to a memory location in memory block 107. As shown by FIG. 8, the storage locations in memory block 107 are allocated to the first protection domain (i.e., PD1). Therefore, the memory controller 82b is configured to compare the access key received from SAM 71 along with the write request to the access key stored in the memory controller 82b that is unique to PD1. If the compared access keys match, then the data value to be stored in the memory block 107 is from a processor 62 of an authorized protection domain, and the memory controller 82 stores the data value, as described herein.

However, if the compared access keys do not match, then the data value attempting to be stored in the memory block 107 is from a processor 62 of a protection domain that has not been allocated to the memory block 107. Therefore, the memory controller 82 refrains from storing the data value in the memory block 107 and produces an error message to indicate that an attempt to store data from a processor 62 of an unauthorized protection domain has occurred.

The existence of the SAM 71 helps to better allocate memory to the various protection domains. In this regard, memory is frequently reallocated during operation, thereby resulting in frequent updates to the mapper 76. Commonly assigned U.S. Pat. No. 6,473,845, entitled "System and Method for Dynamically Updating Memory Address Mappings," which is incorporated herein by reference, describes a methodology for updating the mapper 76 when memory is being reallocated. To lower the efficiency cost in processing data and, in particular, updating mapper 76, each entry in the mapper 76 may be associated with a relatively large block of memory. Further, protection domains may be implemented by controlling which processors 62 may access an entry of the mapper 76. However, this results in all of the memory associated with the same entry being assigned to the same protection domain. Thus, in some situations, additional memory units 85a–85d may need to be added to provide one protection domain with additional memory, even though some of the other protection domains may be assigned to memory that is not being used. The SAM 71 alleviates this type of problem by enabling the protection domains to be assigned to smaller allocations of memory.

For example, assume that the mapper 76 includes 10 entries associated with 1,000,000 ("1 meg") memory locations. In this regard, the 10 entries may be used to map bus addresses to each of the 1 meg memory locations. In this example, each entry is likely to be associated with (i.e., have the capability to map to) 100,000 ("100 k") memory locations. Thus, if protection domains are implemented by controlling which processors 62 may access which entries, then each contiguous memory block allocated to a particular protection domain includes at least 1 k memory locations.

However, assume that the SAM 71 is used to implement the protection domains and that the SAM 71 includes 100 entries, in which each entry may include a different access key. In this example, each contiguous memory block allocated to a particular protection domain includes at least 10,000 ("10 k") memory locations. Therefore, by using the SAM 71, the size of the memory blocks that can be allocated to a protection domain is reduced by a factor of 10, resulting in better allocation of memory resources.

It should be noted, however, that the SAM 71 is not a necessary feature to enable the mapper 76 to interleave checksum data across the different memory systems 59a–59d. Although, the SAM 71 enables better allocation of memory resources, the SAM 71 may be removed from the system 50, if desired.

Through techniques similar to the techniques previously described herein, data may be retrieved from the memory units 85a–85d. In this regard, when one of the processors 62 executes an instruction to retrieve data, a retrieval request is transmitted by the processor 62 to the SAM 71 coupled to the processor 62. The retrieval request includes the bus address that identifies where the data is to be retrieved. The SAM 71 transmits an access key identifying the protection domain associated with the processor 62 that transmitted the retrieval request. The SAM 71 also transmits the retrieval request to mapper 76.

The mapper 76 maps the bus address of the retrieval request into a memory unit address that includes a memory system identifier and a memory unit offset. The memory system identifier identifies the memory system 59a, 59b, 59c, or 59d storing the requested data, and the memory unit offset identifies the location within the memory unit 85a, 85b, 85c, or 85d of the identified memory system 59a, 59b, 59c, or 59d where the data is actually stored. There is no need for the mapper 76 to transmit a checksum system identifier in response to a retrieval request, since checksum values are not updated in response to data reads.

The memory controller 82a, 82b, 82c, or 82d of the memory system 59a, 59b, 59c, or 59d identified by the memory system identifier compares the access key transmitted from the SAM 71 with the appropriate access key stored in the memory controller 82a, 82b, 82c, or 82d to ensure that the protection domain of the processor 62 attempting to access the requested data is the same protection domain allocated to the memory unit location being accessed. If the protection domain of the processor 62 attempting to access the requested data is authorized to access the data block storing the requested data, then the memory controller 82a, 82b, 82c, or 82d retrieves the data value at the location corresponding to the memory unit offset and returns this data value to the requesting processing unit 57a, 57b, 57c, 57d, or 57e. If the protection domain of the processor 62 attempting to access the requested data is not authorized to access the data block storing the requested data, then the memory controller 82a, 82b, 82c, or 82d refrains from retrieving the foregoing data value and produces an error message instead. In an alternative embodiment, the memory controller 82a, 82b, 82c, or 82d that retrieves the data value may transmit the retrieved data value directly to the processor 62 requesting the retrieved data value without utilizing mapper 76.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A computer system, comprising:

memory systems, each of said memory systems having memory and a memory controller for storing and retrieving data;

at least one processor configured to transmit requests to write data values, said requests including bus addresses;

a first mapper configured to map said bus addresses into memory addresses, each of said memory addresses identifying a memory location in one of said memory systems, said first mapper configured to map a consecutive set of bus addresses such that memory addresses mapped from said consecutive set of bus addresses are interleaved across a plurality of said memory systems, said first mapper further configured to identify a plurality of checksum system identifiers in response to said requests, said checksum system identifiers identifying each of said plurality of memory systems, said first mapper configured to utilize said checksum system identifiers to indicate locations of checksum values to be updated based on said data values, said first mapper having a plurality of entries, each of said entries identifying a respective block of contiguous memory within a respective one of said memory systems, said first mapper configured to map one of said bus addresses to one of said entries and to one of said memory addresses identifying a memory location within the block of contiguous memory identified by said one of said entries; and a second mapper having access keys, said second mapper configured to map, to different ones of said access keys, a plurality of different bus addresses that are mapped to a same one of said entries by said first mapper such that each of said different ones of said access keys is mapped to less than all of said plurality of different bus addresses by said second mapper.

2. The computer system of claim 1, wherein each of said plurality of checksum system identifiers is identified by said first mapper in response to a respective one of said requests and identifies one of said memory systems storing a checksum value to be updated based on a data value associated with said one request.

3. The system of claim 1, wherein said first mapper is configured to calculate a memory unit offset of said one of said memory addresses based on said one of said bus addresses.

4. The system of claim 1, wherein each of said access keys uniquely identifies a respective protection domain.

5. The system of claim 4, wherein each of said memory systems has a memory unit and a memory controller that stores access keys and that is configured to access data values stored in said memory unit, and wherein said second mapper is configured to transmit one of said access keys of said second mapper to a memory controller of one of said memory systems, said memory controller of said one memory system configured to perform a comparison between said transmitted access key and an access key stored by said memory controller of said one memory system and to access one of a plurality of data values stored in a memory unit of said one memory system based on said comparison.

6. The system of claim 5, wherein said memory controller of said one memory system is further configured to access said one data value in response to a determination that said transmitted access key corresponds to said access key stored by said memory controller of said one memory system.

7. A computer system, comprising:

memory systems, each of said memory systems having memory locations for storing data;

at least one processor configured to transmit requests to write data values to said memory locations in said memory systems, said requests including bus addresses;

a first mapper configured to map consecutive ones of said bus addresses to a plurality of memory addresses, respectively, each of said memory addresses identifying a memory location in a different one of said memory systems, said first mapper further configured to associate each of said memory addresses with a different one of a plurality of checksum identifiers, each of said checksum identifiers identifying a different one of said memory systems, said first mapper having a plurality of entries, each of said entries identifying a different block of contiguous memory locations in said memory systems, said first mapper configured to map said consecutive ones of said bus addresses to said plurality of memory addresses by mapping said consecutive ones of said bus addresses to different ones of said entries; and a second mapper having a plurality of different access keys, said second mapper configured to map, to said plurality of different access keys, a plurality of different bus addresses that are mapped to a same one of said entries by said first mapper, wherein each of said different bus addresses is mapped to only a respective one of said access keys, wherein each of said checksum identifiers that is associated with a particular one of said memory addresses identifies one of said memory systems storing a checksum value that is based on a data value stored at a memory location identified by said particular one memory address.

8. The computer system of claim 7, wherein said first mapper is further configured to transmit a write request in response to one of said requests transmitted by said at least one processor, said write request including one of said memory addresses mapped, by said first mapper, from a respective one of said bus addresses included in said one of said requests, said write request further including one of said data values and one of said checksum identifiers, wherein a particular one of said memory systems that is identified by said memory address included in said write request is configured to store said one of said data values in a memory location identified by said memory address included in said write request, said particular one memory system further configured to form a combined value by combining said one of said data values with a data value previously stored in said memory location identified by said memory address included in said write request, said particular one memory system further configured to transmit said combined value and said one checksum identifier to another of said memory systems that is identified by said one checksum identifier, said other memory system configured to update a checksum value based on said combined value.

9. The computer system of claim 8, wherein said particular one memory system forms said combined value by exclusively oring said one of said data values with the data value previously stored in said memory location that is identified by said memory address included in said write request.

10. A computer system, comprising:
memory systems, each of said memory systems having memory locations for storing data;
at least one processor configured to transmit requests to write data values to said memory locations in said memory systems, said requests including bus addresses; and
a mapping system configured to map consecutive ones of said bus addresses to a plurality of memory addresses, respectively, each of said memory addresses identifying a memory location in a different one of said memory systems, said mapping system further configured to associate each of said memory addresses with a different one of a plurality of checksum identifiers, each of said checksum identifiers identifying a different one of said memory systems,
wherein each of said checksum identifiers that is associated with a particular one of said memory addresses identifies one of said memory systems storing a checksum value that is based on a data value stored at a memory location identified by said particular one memory address, and wherein said mapping system includes:
a first mapper having a plurality of entries, each of said entries including a memory system identifier identifying one of said memory systems and a memory unit offset corresponding to one of said memory locations in said memory system identified by said memory system identifier included in said each entry, said first mapper configured to utilize said entries to map each of a plurality of said bus addresses to different ones of said memory addresses; and
a second mapper having a plurality of entries, each of said entries including one of a plurality of access keys, each of said access keys uniquely identifyng a respective protection domain, said second mapper configured to map each of said bus addresses to a respective one of said access keys, wherein said second mapper mas different ones of said access keys to a plurality of different bus addresses that are mapped to a same one of said first mapper entries such that each of said different ones of said access s keys is mapped to less than all of said plurality of different bus addresses by said second mapper,
wherein said mapping system is configured to transmit one of said access keys mapped from one of said bus addresses along with one of said memory address mapped from said one bus address.

11. The system of claim 10, wherein one of said memory systems identified by said one memory address mapped from said one bus address is configured to analyze said one access key and to authorize, based on said one access key, storage to a memory location identified by said one memory address mapped from said one bus address.

12. A processing system, comprising:
memory systems, each of said memory systems having memory and a memory controller for storing data to said memory and retrieving data from said memory;
means for transmitting requests to write data values, said requests including consecutive bus addresses;
means for mapping said consecutive bus addresses into memory addresses such that each of said memory addresses identifies a memory location in a different one of said memory systems, said mapping means configured to select checksum system identifiers in response to said requests to write data values such that said checksum system identifiers identify each of said plurality of said memory systems, said mapping means having a plurality of entries, each of said entries identifyng a different block of contiguous memory locations in said memory systems, said mapping means configured to map said consecutive bus addresses to different ones of said entries;
means for mapping, to a plurality of different access keys, a plurality of different bus addresses that are mapped to same a one of said entries such that each of said plurality of different access keys is mapped to less than all of said plurality of different bus addresses; and
means for updating checksum values stored in each of said plurality of said memory systems based on said checksum system identifiers.

13. The processing system of claim 12, further comprising:
means for recovering one of said data values based on one of said checksum values.

14. The processing system of claim 12, wherein said processing system further comprises:
means for authorizing storage to a location in one of said memory systems based on one of said memory addresses mapped from one of said bus addresses and based on one of said access keys mapped from said one of said bus addresses.

15. A method, comprising the steps of:
providing memory systems, each of said memory systems having memory and a memory controller for storing and retrieving data;

receiving requests to write data values, said requests including consecutive bus addresses;

mapping said consecutive bus addresses into memory addresses, said mapping including the step of mapping said consecutive bus addresses to different entries of a mapper, each of said entries identifying a block of contiguous memory locations within a respective one of said memory systems;

mapping, to a plurality of different access keys, a plurality of different bus addresses that are mapped to a same one of said entries such that each of said plurality of different access keys is mapped to less than all of said plurality of different bus addresses;

identifyng each of said memory systems based on said memory addresses;

selecting checksum system identifiers in response to said requests to write data values;

identifying each of said plurality of said memory systems based on said checksum system identifiers; and updating checksum values stored in each of said plurality of said memory systems based on said checksum identifiers.

16. The method of claim 15, further comprising the steps of: storing said data values in said memory systems based on said memory addresses; and utilizing said data values to update said checksum values in said updating.

17. The method of claim 15, further comprising the step of: recovering one of said data values based on one of said checksum values.

18. The method of claims 15, further comprising the steps of:

transmitting one of said access keys to one of said memory systems;

comparing said one access key to an access key stored by a memory controller of said one memory system; and accessing one of a plurality of data values stored in a memory unit of said one memory system based on said comparing.

19. The method of claim 18, wherein said accessing is performed in response to a determination that said one access key corresponds to said access key stored by said memory controller of said one memory system.

20. A method, comprising the steps of:

providing memory systems, each of said memory systems having memory and a memory controller for storing and retrieving data;

receiving requests to write data values, said requests including consecutive bus addresses;

mapping said consecutive bus addresses into memory address, said mapping including the step of mapping said consecutive bus addresses to different entries of a mapper, each of said entries identifying a block of contiguous memory locations within a respective one of said memory systems;

mapping, to a plurality of different access keys, a plurality of different bus addresses that are mapped to a same one of said entries such that each of said plurality of different bus addresses is mapped to only a respective one of said plurality of different access keys;

interleaving said memory addresses across each of said memory systems;

storing said data values based on said memory addresses.

21. A computer system, comprising:

memory systems;

a first mapper having a plurality of entries, said first mapper configured to map a consecutive set of bus addresses to memory addresses that are interleaved across said memory systems, said first mapper configured to map said bus addresses to checksum identifiers that are interleaved across said memory systems, said first mapper configured to map each of said bus addresses to a different one of said entries, each of said entries identifying a block of contiguous memory locations in a different one of said memory systems; and a second mapper having a plurality of access keys, said second mapper configured to map said bus addresses to said access keys, wherein said first mapper is configured to map a plurality of different bus addresses to a same one of said entries and said second mapper is configured to map each of said plurality of different bus addresses to a different one of said access keys such that at least one of said access keys is mapped to a respective one but less than all of said plurality of different bus addresses.

22. The system of claim 21, wherein said second mapper is configured to transmit, for each of said plurality of bus addresses, one of said access keys to at least one of said memory systems.

23. The system of claims 22, wherein at least one of said memory systems is configured to authorize, based on an access key received from said second mapper, storage to a memory location identified by one of said memory addresses.

24. The system of claim 21, wherein each of said memory systems has a memory unit and a memory controller that stores access keys and that is configured to access data values stored in said memory unit, and wherein said second mapper is configured to transmit one of said access keys of said second mapper to a memory controller of one of said memory systems, said memory controller of said one memory system configured to perform a comparison between said transmitted access key and an access key stored by said memory controller of said one memory system and to access one of a plurality of data values stored in a memory unit of said one memory system based on said comparison.

25. The system of claim 24, wherein said memory controller of said one memory system is further configured to access said one data value in response to a determination that said transmitted access key corresponds to said access key stored by said memory controller of said one memory system.

* * * * *